United States Patent [19]

van der Lely

[11] 4,173,352

[45] Nov. 6, 1979

[54] COMBINATION ARTICULATED TRACTOR AND TOW CAR

[76] Inventor: Cornelis van der Lely, 7, Brüschenrain, Zug, Switzerland

[21] Appl. No.: 733,373

[22] Filed: Oct. 18, 1976

[30] Foreign Application Priority Data

Oct. 16, 1975 [NL] Netherlands ................. 7512128

[51] Int. Cl.² .................................. B60D 1/14
[52] U.S. Cl. ........................ 280/415 A; 172/447; 172/450; 180/54 C; 180/134; 280/5 A; 280/460 A; 280/490 A; 280/491 E; 280/515; 180/233
[58] Field of Search .......... 280/415 A, 456 A, 456 R, 280/446 A, 460 A, 461 A, 462, 477, 478 B, 490 A, 492, 493, 494, 495, 498, 499; 180/1 F, 51, 54 C, 52, 134; 172/450, 447

[56] References Cited

U.S. PATENT DOCUMENTS

| | | | |
|---|---|---|---|
| 2,341,807 | 2/1944 | Olmstead | 280/446 A |
| 2,462,726 | 2/1949 | Currie | 280/499 |
| 2,473,357 | 6/1949 | Blunier | 280/499 X |
| 2,534,109 | 12/1950 | De Witt | 280/499 |
| 2,625,089 | 1/1953 | Pursche | 280/499 X |
| 3,310,123 | 3/1967 | Abbott | 172/450 |
| 3,503,625 | 3/1970 | Muller | 172/450 X |
| 3,612,576 | 10/1971 | Marler | 280/478 B |
| 3,690,395 | 9/1972 | Spiller | 180/51 X |

FOREIGN PATENT DOCUMENTS

| | | | |
|---|---|---|---|
| 910196 | 9/1972 | Canada | 180/134 |
| 203257 | 3/1966 | Sweden | 280/456 A |

*Primary Examiner*—John P. Silverstrim
*Attorney, Agent, or Firm*—Penrose Lucas Albright; William B. Mason

[57] ABSTRACT

The invention relates to an articulated tractor with two engines in tandem, particularly an agricultural tractor having a three-point lifting device. A unit having a selectively positioned drawbar adapted to turn about an upright shaft carried between parallel supporting plates is detachably fastened to the lifting device.

5 Claims, 11 Drawing Figures

COMBINATION ARTICULATED TRACTOR AND TOW CAR

SUMMARY OF THE INVENTION

This invention relates to agricultural and other tractors which are of the kind that comprise units located one behind the other in the intended direction of straight forward travel, at least one of said units including an axle provided with wheels and a driving engine supported by said axle.

According to one aspect of the invention, there is provided a tractor of the kind set forth, wherein the driving engine is located at least partly to one side of the associated wheel axle and the center of gravity of said one unit is located at the side of the wheel axle which is remote from the driving engine, when the tractor is viewed in plan.

For a better understanding of the invention, and to show how the same may be carried into effect, reference will now be made, by way of example, to the accompanying drawings, in which:

DESCRIPTION OF THE PREFERRED EMBODIMENTS

Figure 1:
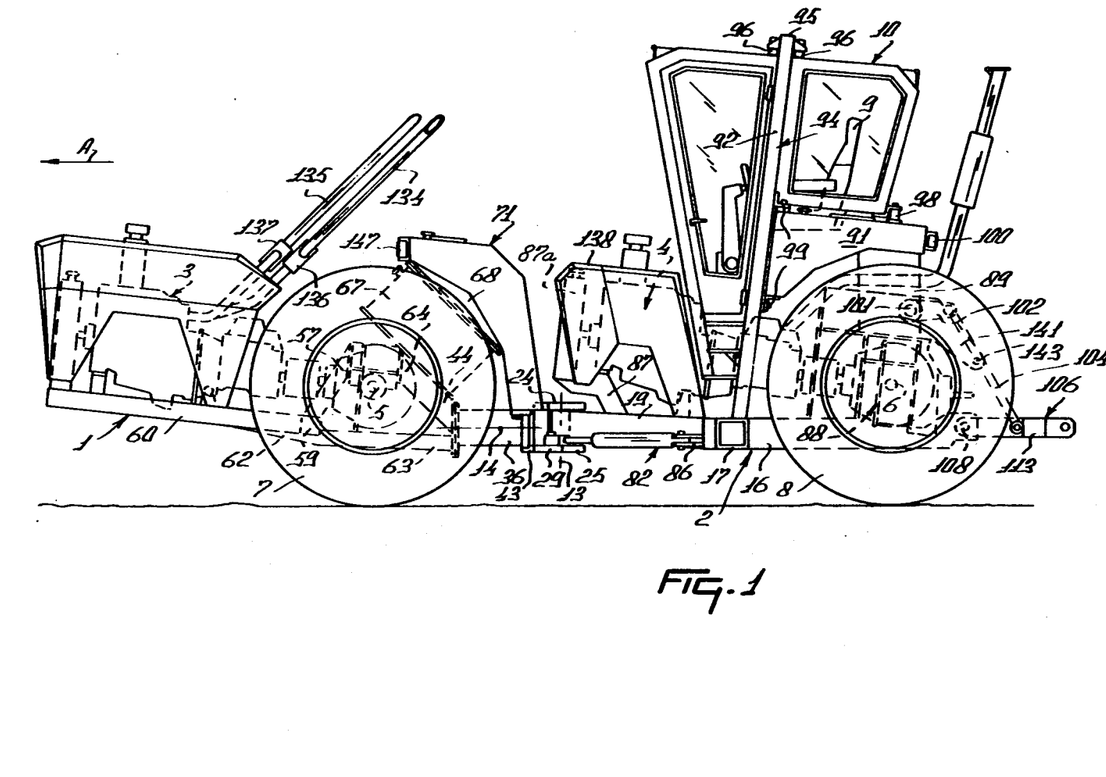
FIG. 1 is a side elevation of a tractor in accordance with the invention.
Figure 2:
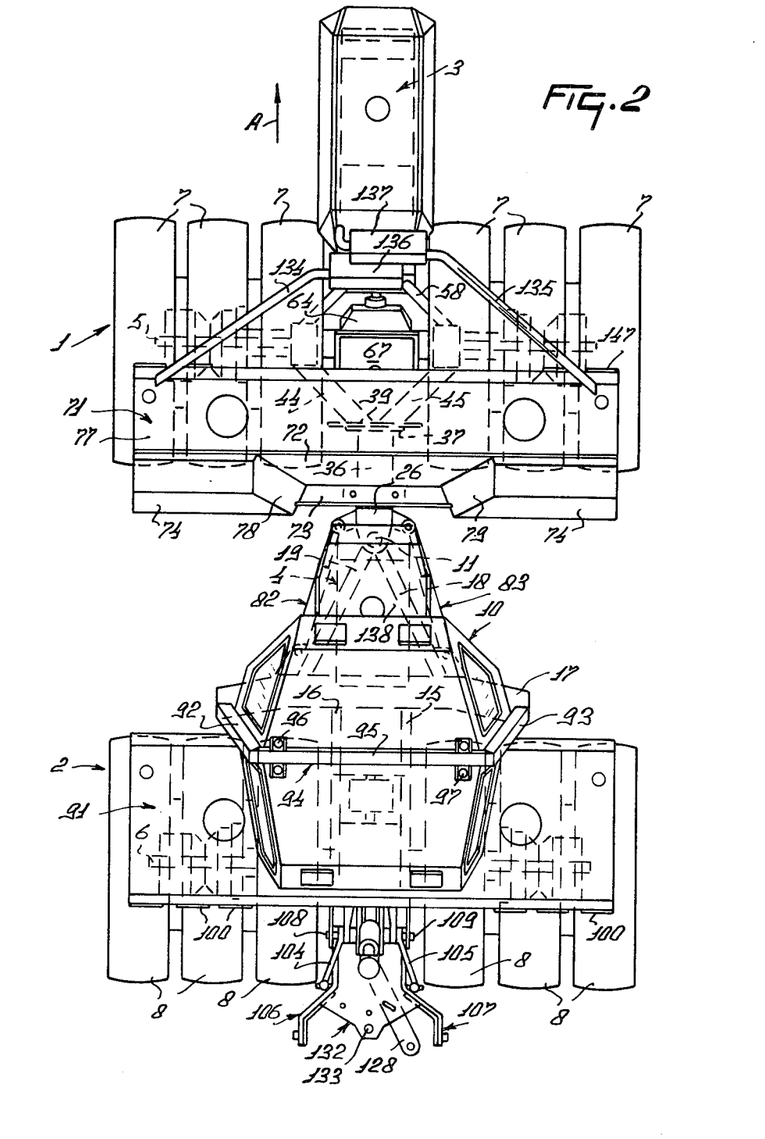
FIG. 2 is a plan view of the tractor of FIG. 1.
Figure 3:
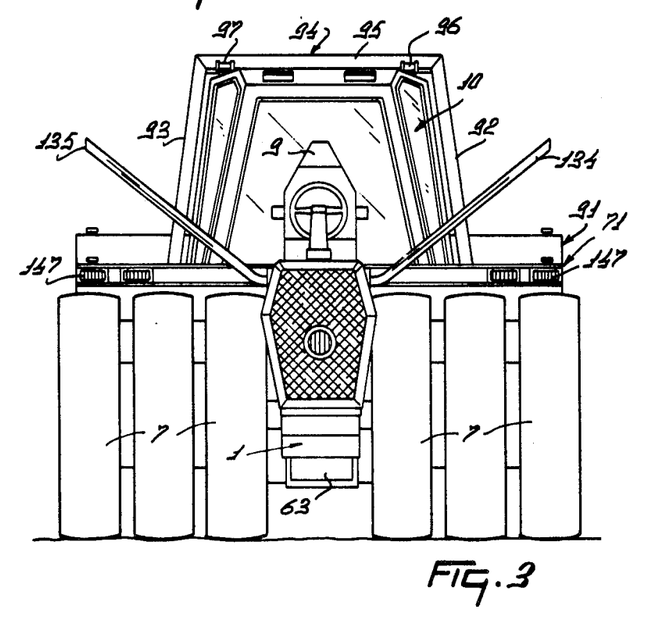
FIG. 3 is a front view of the tractor shown in FIG. 1.

Referring to FIGS. 1 to 10 of the drawings, the tractor that is illustrated comprises a frame having a leading frame portion 1 and a rear frame portion 2, which frame portions are arranged to be turnable relative to one another in a manner to be described more fully hereinafter. Considered in the intended direction of straight forward travel A, the leading frame portion 1 is supported from the ground by a foremost wheel axle 5 and the rear frame portion 2 is supported by a rear wheel axle 6 (FIG. 1). The front axle 5 is provided with a total of six front wheels 7, three of which are located on one side of an imaginary vertical plane of substantial symmetry of the tractor that extends in the direction A and three on the other side thereof. The rear axle 6 also has six rear wheels 8, three of which are located on one side of said plane of symmetry and three on the other side. As viewed in side elevation (FIG. 1), a driving seat 9 is arranged above the foremost parts of the rear wheels 8 and is surrounded by a driving cabin 10 arranged partly in advance of the rear wheels 8.

Two power units comprising driving engines 3 and 4 of the tractor are arranged one behind the other with respect to the direction A and are located, in this embodiment, longitudinally in register in the direction A but, in principle, they may be laterally offset with respect to each other. In this embodiment, vertical planes of substantial symmetry of engines 3 and 4 approximately coincide with the aforementioned plane of substantial symmetry of the tractor itself, axles 5 and 6 being in parallel positions. Each of engines 3 and 4 (preferably Diesel engines each having a power rating of substantially 2000 HP) comprises a cooler or radiator, tanks for fuel and other liquids, associated hydraulic or mechanical clutches, associated hydraulic mechanical torque converters (gear boxes) and differential gears, together with which parts they constitute two independently opeaable engine units secured to the leading frame portion 1 and to the rear frame portion 2 respectively. The leasing engine unit (including the engine 3) drives front wheels 7 and the rear engine unit (including the engine 4) drives rear wheels 8.

As seen in plan, engine 3 is fixedly secured to front wheel axle 5, with which it forms a unit. Similarly, engine 4 that is fixedly secured to rear wheel axle 6, as seen in plan, constitutes a unit with that axle. Engine 3 is located at least partly to one side of wheel axle 5, that is to say, as shown in FIG. 1 and with respect to the direction A, in front of wheel axle 5, the rear of engine 3 being spaced from wheel axle 5 by a distance substantially equal to the length of engine 3 itself as measured in the direction A. Considered in the same direction, engine 4 is also located in front of the associated wheel axle 6, the rear of engine 4 being at a distance in front of said axle which is substantially equal to the length of engine 4 as measured in the direction A.

The tractor principally comprises two consecutive, interconnected units, the leading unit including the above-mentioned engine unit with engine 3, frame portion 1 and wheel axle 5, whereas the rear unit includes the engine unit with engine 4, frame portion 2 and wheel axle 6. These two units are coupled with one another by two pivotal shafts located between wheel axles 5 and 6. A first pivotal shaft includes a vertical shaft 11 having an axis 13, which is located behind a second pivotal shaft, considered in the direction A, the latter comprising a horizontal shaft 12 having an axis 14 which is located in the vertical plane of substantial symmetry of the leading unit. The substantially vertical axis 13 of shaft 11 may be located in the longitudinally extending vertical plane of substantial symmetry of the leading unit and is always located in the vertical plane of substantial symmetry of the rear unit (see FIGS. 1, 2, 5, 6, 7, and 8). The substantially vertical pivotal shaft which includes shaft 11 is part of the pivotal steering control of the tractor; it should be noted here that axle 5 of the leading unit is not pivotable with respect to the frame portion 1 thereof and that axle 6 is not pivotable with respect to frame portion 2 of the rear unit.

Figure 6:
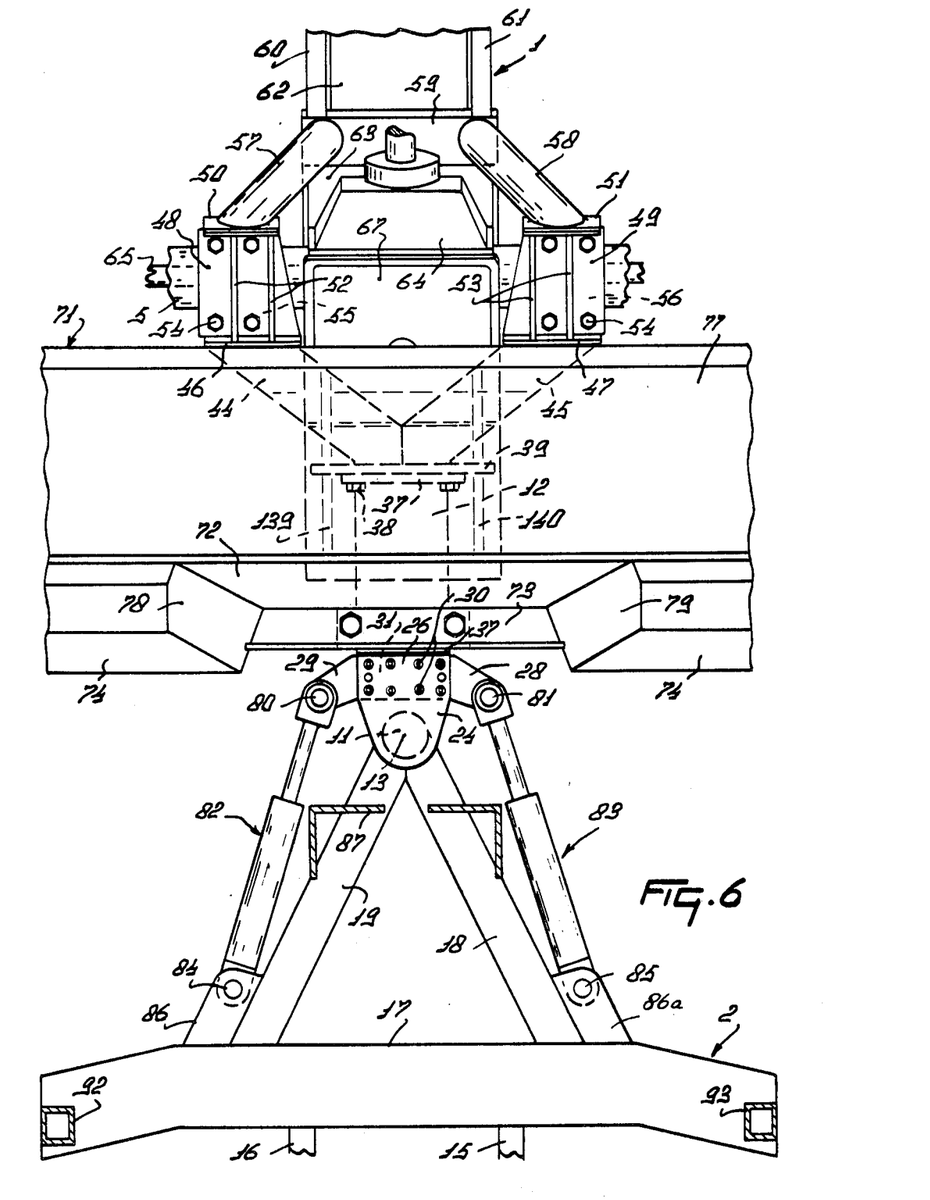
FIG. 6 is a plan view of the region shown in FIG. 5.

Frame portion 2 of the rear unit comprises two substantially horizontal supports 15 and 16 that extend parallel to the longitudinal, vertical plane of substantial symmetry of the rear unit. Supports 15 and 16, which hold inter alia part of a lifting device as will be set out more fully hereinafter, are disposed one on each side of said plane of substantial symmetry at equal distances from the same. Supports 15 and 16 are partly located between the most inboard pair of rear wheels 8 and are rigidly secured at the front to a horizontally extending hollow frame beam 17, said beam 17 being perpendicular to the direction A. The length of frame beam 17 is approximately equal to the distance between the vertical planes of symmetry of the two penultimately outermost wheels 8 and is also substantially equal to the length of that part of the tractor which is located behind frame beam 17, considered in the direction A. The front of frame beam 17 is provided with two supports 18 and 19, the fastening points of which on beam 17 are located at a distance from the longitudinal, vertical plane of substantial symmetry of the rear unit. Two supports 18 and 19 are disposed symmetrically with respect to said plane of substantial symmetry of the rear unit and extend forwardly away from beam 17 to converge in said direction while, at a distance in front of beam 17, supports 18 and 19 are fastened to one another and locally hold shaft 11 of the substantially vertical pivotal or steering shaft (FIG. 6).

Shaft 11 is a heavy, solid shaft provided at the top and bottom with stub shafts 20 and 21 (FIG. 8) which have lines that coincide with the axis 13 of shaft 11. Both stub shafts 20 and 21 are surrounded by bearing shells 22. The bearing shell 22 of stub shaft 20 and the bearing shell 22 associated with stub shaft 21 co-operate with bearing shells 23 fastened in lugs 24 and 25 respectively, which lugs are integral with an upper cover plate 26 and a lower cover plate 27 respectively. Lower cover plate 27 is furthermore provided with laterally and rearwardly inclined lugs 28 and 29 (FIG. 6) disposed symmetrically with respect to the longitudinal, vertical plane of substantial symmetry of the leading tractor unit. Lugs 28 and 29 together with cover plate 27 and lug 25 form a single, rigid assembly. This assembly, as well as the assembly of cover plate 26 and the lug 24, is essentially plate-shaped and is horizontally disposed. Cover plates 26 and 27 are fastened by bolts 30 to either side of a solid steel block 31 formed in substantially the shape of a parallelepiped. Block 31 is integral with a cylindrical part extending forwardly away from block 31 and forming shaft 12. A horizontal plane containing axis 14 of the shaft 12 is also the plane of symmetry of block 31 and of shaft 11. The length of shaft 12, measured in a horizontal direction along axis 14, is not less than twice the length of shaft 11 measured along axis 13. Near its two ends, shaft 12 is provided with bearing shells 32 and 33 that locally surround the shaft and co-operate with bearing shells 34 and 35 respectively which are fastened to a cylindrical supporting tube or bearing part 36, the center line or axis of which coincides with axis 14. Bearing shells 32 and 34 are located at a distance from bearing shells 33 and 35 which is not less than twice the diameter of shaft 12. The end of tube 36 facing block 31 is freely movable with respect to said block, whereas the end of tube 36 remote from the block 31 is rigidly secured by a flange 37 and bolts 38 to a supporting plate 39 which plate is located at a distance in front of the leading end of shaft 12. A pressure plate 40 is arranged in the space between plate 39 and shaft 12 for pressing bearing shell 32 against bearing shell 34 held by tube 36 and hence also bearing shell 35 against bearing shell 33 (See FIGS. 7 and 8).

Figure 7:
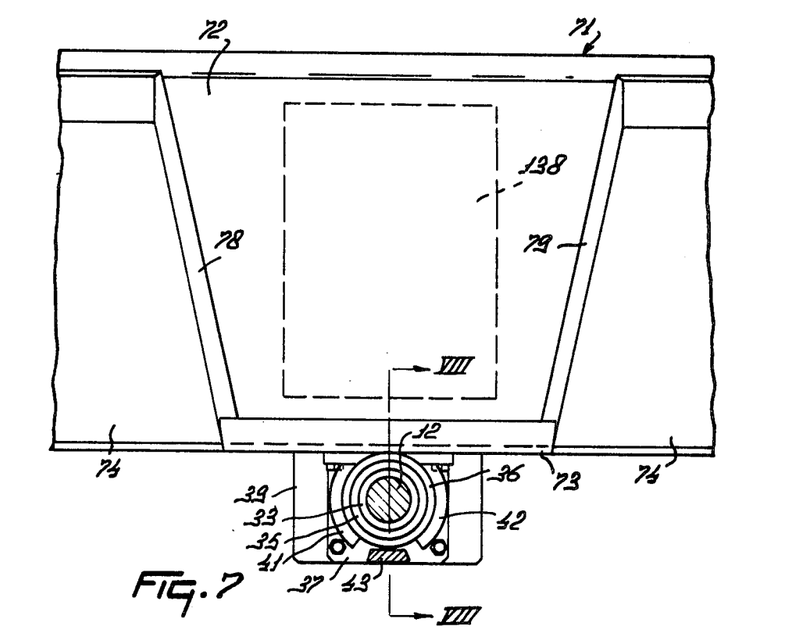
FIG. 7 is a section taken on the line VII—VII in FIG. 5.
Figure 8:
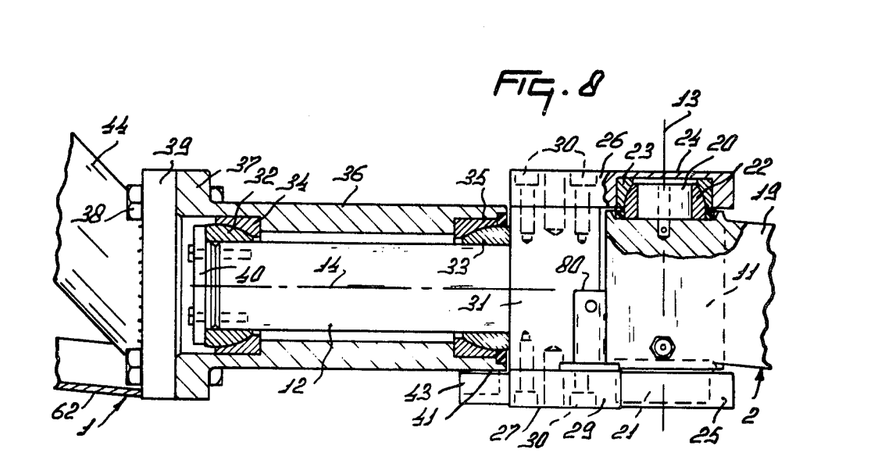
FIG. 8 is a part-sectional elevation, the section being taken on the line VIII—VIII in FIG. 7.
Figure 9:
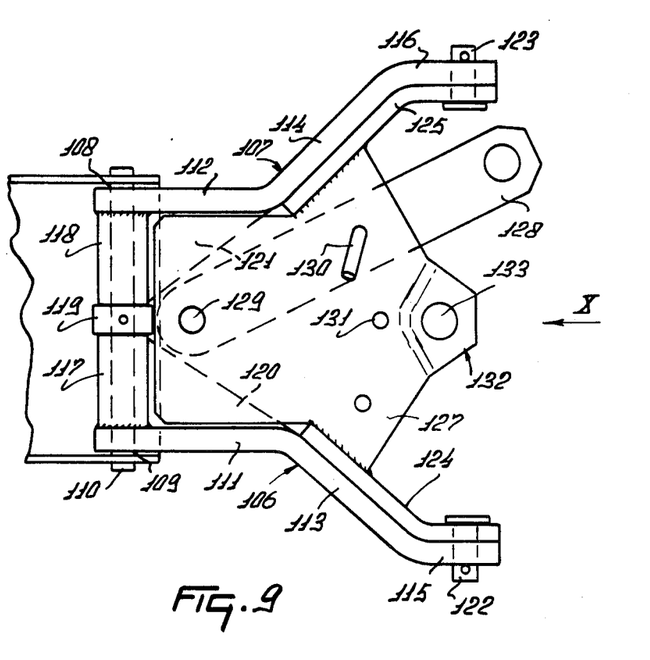
FIG. 9 is a plan view of part of a lifting device of the tractor.

The sides of the outer periphery of tube 36 are provided with two curved strips 41 and 42 near the block 31 (FIGS. 5 and 7), the inner sides of which strips fit around the cylindrical periphery of supporting tube 36 and are arranged symmetrically with respect to the longitudinal, vertical plane of substantial symmetry of the leading tractor unit. The two lower ends of strips 41 and 42 are spaced apart by a predetermined circumferential angle, viewed from axis 14. The bottom of block 31 is provided with a stop or lug 43 projecting forwardly in the direction of flange 37 and being located, as is shown in FIG. 7, with clearance in the space between the lower boundary surfaces of strips 41 and 42.

Figure 5:
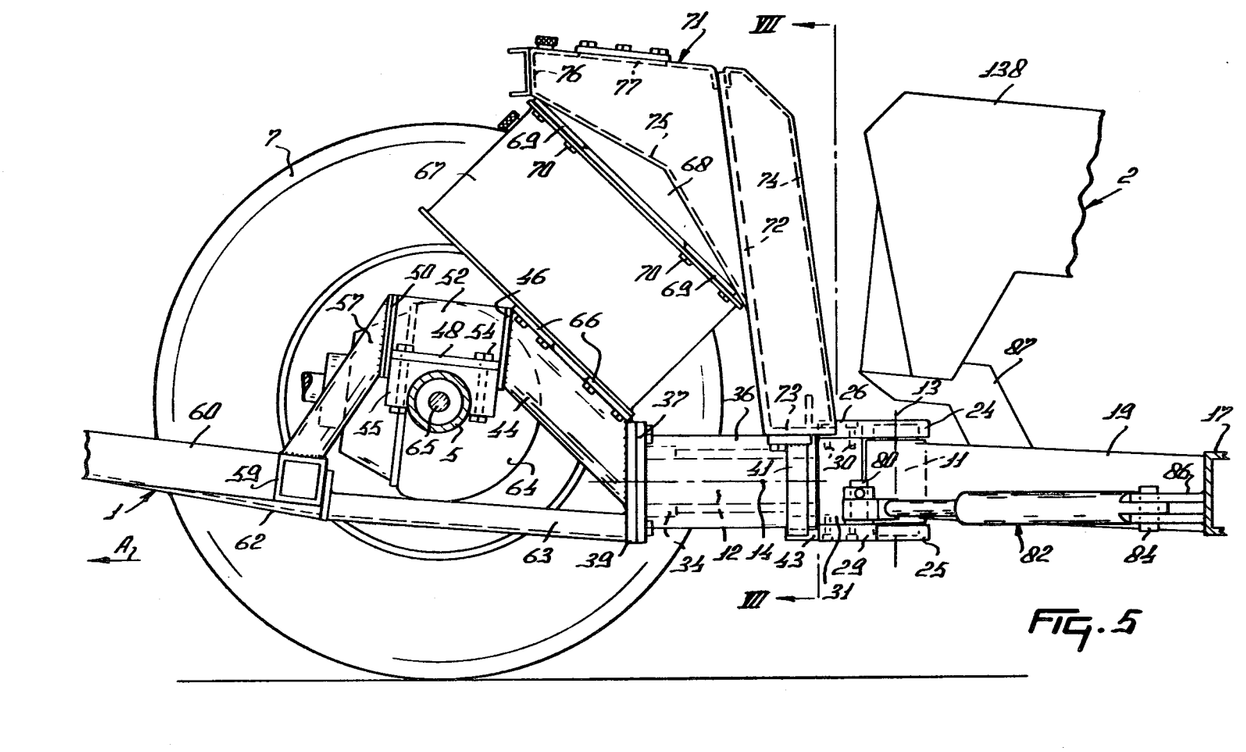
FIG. 5 is a side elevation, to an enlarged scale, of a central region of the tractor, part of the front wheels being concealed and a foremost engine unit being omitted.

The leading boundary surface of the supporting plate 39, viewed in the direction A, is provided with two round tubes 44 and 45 which are inclined forwardly, upwardly and laterally away from plate 39. As seen in plan and with respect to the direction A, tubes 44 and 45 diverge from plate 39 to the front. As viewed in side elevation, the length of the two tubes 44 and 45 (FIG. 5) is not less than the length of tube 36. Tubes 44 and 45 are fastened near their upper and leading ends, which are spaced from one another as seen in plan, to upwardly extending supporting plates 46 and 47 respectively, each of which plates is rigidly secured to substantially horizontal mounting plates 48 and 49 respectively. At the leading edges of mounting plates 48 and 49, remote from the supporting plates 46 and 47, supporting plates 50 and 51 respectively are rigidly secured so as to extend upwardly and parallel to plates 46 and 47. Between supporting plates 46 and 50 and mounting plate 48 and, in a similar manner, between supporting plates 47 and 51 and the associated mounting plate 49, a plurality of stiffening plates 52 and 53 extend substantially parallel to the longitudinal, vertical plane of substantial symmetry of the leading unit. The lower ends of mounting plates 48 and 49 are provided, by means of bolts 54, with pressure members 55 and 56 respectively, said members 55 and 56 having a semi-cylindrical cavity remote from plates 48 and 49, the center line or axis of said cavity being horizontal and perpendicular to the longitudinal, vertical plane of substantial symmetry of the leading unit. Front wheel axle 5 is rigidly secured in said cavity (FIG. 5). From each of the two relatively spaced supporting plates 50 and 51, tubes 57 and 58 respectively are inclined downwardly and inwardly to the front and are rigidly secured in place, said two tubes 57 and 58 converging towards the front, as seen in plan. Tubes 57 and 58 are symmetrically arranged with respect to the longitudinal, vertical plane of substantial symmetry of the leading unit and, at the ends thereof remote from supporting plates 50 and 51, they terminate in a substantially horizontal, forwardly and upwardly inclined plane and are locally rigidly secured to a transverse beam 59 extending perpendicular to the longitudinal plane of substantial symmetry of the leading unit. As seen in plan, the length of transverse beam 59 is slightly less than the distance between mounting plates 48 and 49. At the front surface of the square cross-section transverse beam 59, two supports 60 and 61 are secured near the two opposite ends of said beam, one on each side at a distance from the longitudinal, vertical plane of substantial symmetry of the leading unit. As seen in FIG. 5, the two parallel supports 60 and 61 extend upwardly away from the transverse beam 59 at an angle of about 10°. At least part of the engine unit which includes engine 3 is secured to the two supports 60 and 61. On their lower ends, supports 60 and 61 are interconnected by a U-shaped protecting plate 62 while, between the transverse beam 59 and supporting plate 39, a further protective plate 63 is provided to serve additionally to stiffen tubes 44, 45 and 57, 58 respectively which hold the front wheel axle. The front unit which includes engine 3, the cooler or radiator, the clutch and the torque converter or gear box is furthermore associated with a differential 64 having a housing which is integral with front wheel axle 5. As seen in plan, differential 64 is located between the two mounting plates 48 and 49 and extends, as seen in FIG. 5, to just above the further protective plate 63. Front wheel axle 5 includes a driving shaft 65 which can be driven via differential 64 from engine 3.

At the top of the two tubes 44 and 45, flanges 66 are arranged to extend parallel to a plane that is forwardly inclined at substantially 45° to the horizontal, said plane intersecting a horizontal plane along a horizontal line at right angles to the longitudinal, vertical plane of substantial symmetry of the leading tractor unit. Flanges 66 of the two tubes 44 and 45 have a tank 67 secured to them in an inclined position, which tank may contain, in this embodiment, a hydraulic liquid for actuating hydraulic devices of the tractor but which could contain other liquids such as fuels. Tank 67 has the shape of a parallelepiped and is located, as seen in plan, principally between wheel axle 5 and shaft 11. The boundary surface of tank 67 that is remote from tubes 44 and 45 is provided with at least two supporting plates 68 having each, as seen in the side elevation of FIG. 5, the shape of an isosceles triangle, the base of which coincides with the boundary surface of tank 67 remote from tubes 44 and 45, said supporting plates 68 being provided with flanges 69 which are secured by bolts 70 to said boundary surface of tank 67. Tubes 44 and 45, tank 67 and supporting plates 68 at least partly support a large liquid tank, in this case a fuel tank 71, the greatest length of which is parallel to wheel axle 5, as seen in plan.

Tank 71 comprises a supporting portion principally formed by a substantially L-shaped heavy girder or supporting plate 72 as shown in the view of FIG. 5, the substantially vertical limb of the L being considerably larger than is the horizontal limb thereof. The longer, upright limb of the L-shaped girder or supporting plate 72 partly constitutes an outer boundary of tank 71, whereas the shorter limb constitutes a lower boundary surface of the tank and is provided at the bottom with a pressure plate 73 by which supporting plate 72 bears on supporting tube 36 and the tops of the two strips 41 and 42 respectively. The girder or plate 72 is, moreover, secured to these structural parts. Considered in the direction A, a plate 74 is arranged at a distance behind the heavy girder or supporting plate 72 and extends substantially parallel to the longer limb of said plate 72, plate 74 also forming an outer boundary of tank 71, being secured at its lower end to the shorter limb of plate 72, and being bent over forwardly at the top, where it is fastened to the girder or plate 72 near the upper edge thereof (see FIG. 5). At a distance above the corner of plate 72, as seen in FIG. 5, the longer limb of such L-shaped plate 72 has a wall plate 75 secured to it having a kinked shape (see FIG. 5), wall plate 75 joining the equal sides of the two limbs of supporting plate 68. As seen in FIG. 5, the fastening area of wall plate 75 on the upright longer limb of plate 72 is located near the corner of the tank 67 nearest plate 72. The kinked wall plate 75, which also forms an outer wall of tank 71, terminates near the upper corner of tank 67 in a substantially vertical wall portion 76, which is again bent over to terminate in a substantially horizontal top plate 77 also forming an outer wall of the tank, said top plate 77 joining the upper edge of plate 72 near an upper line of connection between rear wall plate 74 and plate 72. Plate 72 constitutes a general strengthening and stiffening member of tank 71 as a whole, which tank, in this embodiment, has a capacity of substantially 2000 liters and which projects on either side over a considerable distance beyond frame portion 1 and beyond tank 67 is an unsupported manner. Tank 71 is carried to a considerable extent near the ends of plate 75, as shown in FIG. 5, by tank 67, while the liquid contained between plates 72, 75, 76 and 77 is directly sustained by tank 67 and hence by tubes 44 and 45.

Plates 72, 75, 76 and 77 extend perpendicular to the longitudinal, vertical plane of substantial symmetry of the leading tractor unit over a distance which is substantially equal to the overall width of the tractor, or the width thereof that is determined by the six front wheels 7. The space enclosed by the last-mentioned plates is closed near the two ends adjacent to the outermost front wheels 7 by approximately vertical walls. The tank space also associated with tank 71 and bounded by plate 72 and rear wall plate 74 does not entirely cover the whole width of the tractor, and is missing near the longitudinal, vertical plane of substantial symmetry of the leading tractor unit so that, at this place, plate 72 forms a rear boundary of the tank (see FIGS. 2 and 7). The tank spaces formed by plate 72 and rear wall plate 74 on either side of, and at a distance from, the longitudinal, vertical plane of substantial symmetry of the leading tractor unit are bounded on the sides facing said plane of substantial symmetry by partitions 78 and 79 forming boundary walls of tank 71 and being spaced from the longitudinal, vertical plane of substantial symmetry. The two partitions 78 and 79 are in symmetrical positions relative to the longitudinal plane of substantial symmetry and are inclined outwardly from bottom to top (see FIG. 7).

The outer ends of the two lugs 28 and 29 which are rigidly secured to block 31 have vertical pivotal shafts 80 and 81 fastened to them (FIGS. 5 and 6), to which shafts are connected the ends of piston rods of hydraulic piston and cylinder assemblies 82 and 83. The cylinders of assemblies 82 and 83 are turnably supported by pivotal shafts 84 and 85 which extend parallel to pivotal shafts 80 and 81 through plates 86 and 86a fastened to the ends of supports 18 and 19 near frame beam 17 and to frame beam 17 itself. The unit which includes engine 4 and a cooler or radiator 87a is carried at the front by a support 87 (FIGS. 1 and 6), by supports 18 and 19 and, near its sides, by a plate structure 88 arranged on the two supports 15 and 16 which hold rear axle 6 associated with its respective differential gear, in a manner similar to that of front axle 5, at a level above that of supports 15 and 16. Plate structure 88 comprises, at its top located above the differential of the rear engine unit, two vertical plate-shaped supports 89 and 90 (FIGS. 1 and 4) located one on each side of the vertical plane of substantial symmetry, to the tops of which supports is fastened a second tank 91.

The top of frame beam 17 has rigidly secured to it two parallel, upwardly extending and rearwardly inclined limbs 92 and 93 (FIGS. 1 and 6) of a roller bracket 94 having approximately the shape of an inverted U, as seen in direction A. Roller bracket 94 comprises a horizontal tie beam 95 extending perpendicular to the longitudinal, vertical plane of substantial symmetry of the rear tractor unit and interconnecting the upper ends of inclined limbs 92 and 93. At two relatively spaced places on tie beam 95, flexible connecting elements 96 and 97 are provided, by which elements cabin 10 is wholly or partly suspended. At the rear and bottom of cabin 10, further flexible connecting elements 98 (FIG. 1) are connected to the top of tank 91. Tank 91 itself is secured near its foremost boundary surface to limbs 92 and 93 of roller bracket 94 by means of fastening elements 99. Tank 91 is located, as seen in the side elevation of FIG. 1, almost entirely above rear wheels 8, that is to say, mainly above leading parts of said rear wheels 8. Tank 91 is bounded on the top by a substantially horizontal surface at right angles to the vertical plane of substantial symmetry of the rear tractor unit and terminating near the rear wall in an approximately vertical part, which part may be provided with prescribed lighting fittings 100, while said vertical boundary surface is bent over at the bottom towards the front to form a lower boundary surface of tank 91, the shape of which surface substantially matches the shapes of rear wheels 8, as shown in the side elevation of FIG. 1. Tank 91 thus also serves as an mudguard for dirt thrown up by rear wheels 8, said mudguard protecting cabin 10. In a similar manner tank 71, which is arranged, as seen in side elevation, partly above the rear halves of front wheels 7 and partly behind said front wheels serves as a mudguard for dirt thrown up by front wheels 7 towards cabin 10 and engine 4, since plates 72, 75, 76, as seen in FIG. 5 also substantially match the curved shape of the tops and rears of front wheels 7. The length of tank 91 is equal to the length of tank 71, measured perpendicularly to the plane of substantial symmetry of the leading tractor unit, so that the length of tank 91 measured at right angles to the plane of substantial symmetry of the rear tractor unit is approximately equal to the over-all width of the six rear wheels 8. Tank 91 is arranged behind roller bracket 94. The vertical pivotal shaft which includes shaft 11 is located beneath the cooler or radiator 87a of engine 4. At the front side of plate 76 are provided lighting fittings 147, for example, head lamps, spot lights and the like.

Figure 10:
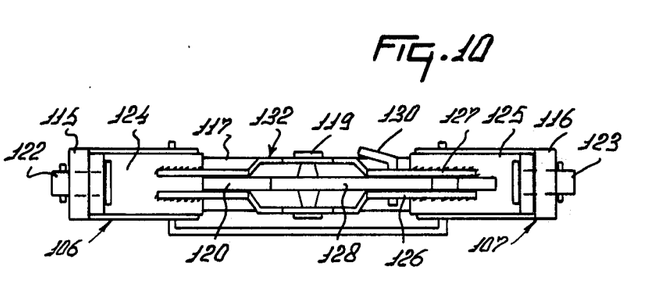
FIG. 10 is a view as seen in the direction of the arrow X in FIG. 9.

A pivotal shaft 101 is fastened in the two supports 89 and 90 so that its axis is at right angles to the plane of substantial symmetry of the rear tractor unit; from seat 9 said pivotal shaft 101 can be actuated by a hydraulic member (not shown). Near the two supports 89 and 90, pivotal shaft 101 has fastened to it two upper lifting arms 102 and 103 of a lifting device, having ends remote from pivotal shaft 101 which are pivotally connected to lifting rods 104 and 105. The ends of lifting rods 104 and 105 that are remote from lifting arms 102 and 103 are pivoted to lower lifting arms 106 and 107, which are in symmetrical positions relative to the vertical plane of substantial symmetry of the rear tractor unit. Lower lifting arms 106 and 107 extend away from pivotal bearings 108 and 109 respectively, which bearings actually form parts of a horizontal shaft 110 that extends perpendicular to the plane of substantial symmetry (see FIGS. 9 and 10). Arms 106 and 107 first extend by portions 111 and 112 respectively to the rear and parallel to the plane of substantial symmetry of the rear tractor unit over a portion still located, viewed in side elevation, inside the circumference of rear wheels 8, portions 111 and 112 being located near the inner surfaces of the two wheels 8 that are nearest the vertical plane of substantial symmetry. Portions 111 and 112 terminate at the rear in rearwardly extending and outwardly inclined portions 113 and 114 which are located, viewed in side elevation, beyond the circumference of rear wheels 8. Finally, portions 113 and 114 terminate in end portions 115 and 116 respectively which portions 115 and 116 extend parallel to the longitudinal, vertical plane of substantial symmetry of the rear tractor unit. Portions 111 and 112 have rigidly fastened to them tubes 117 and 118 respectively, which tubes fit intimately around horizontal shaft 110. At its center, shaft 110 has a shoulder 119 pivotably engaged by the neighboring ends of tubes 117 and 118. Triangular closing plates 120 and 121 respectively are welded between the inner surfaces of portions 111 and 112 and associated tubes 117 and 118 respectively, to stiffen the connections between portions 111 and 112 and tubes 117 and 118. End portions 115 and 116 of lower lifting arms 106 and 107 respectively have pivotal shafts 122 and 123 respectively fastened to them, the center lines or axes of which are coincident and at right angles to the plane of substantial symmetry of the rear tractor unit. Supporting members 124 and 125 can be fastened to the detachable pivotal shafts 122 and 123 respectively. The shapes of supporting members 124 and 125 are such that they engage the inner sides of portions 113, 115 and 114, 116 respectively of lower lifting arms 106 and 107 respectively. The two supporting members 124 and 125 are rigidly connected with one another by two plates 126 and 127 (FIGS. 9 and 10) which are arranged in overlying relationship, parts of the outer circumferences of which plates join parts of the inner boundaries of the supporting members 124 and 125 respectively. Plates 126 and 127 are prolonged from the leading ends of supporting members 124 and 125 in forward directions and have such a shape that, as seen in plan, the plates join the inner sides of portions 111 and 112 respectively of the lower lifting arms with some amount of clearance and moreover the rear boundary lines of tubes 117 and 118. The distance between parallel plates 126 and 127, which are also perpendicular to the plane of substantial symmetry of the rear tractor unit, is such that plates 126 and 127 substantially completely embrace cover plates 120 and 121 at the top and bottom so that the assembly of supporting members 124 and 125 and plates 126 and 127 cannot turn about pivotal shafts 122 and 123 because this is prevented by the closing plates 120 and 121 fastened to the lower lifting arms. Between plates 126 and 127 is furthermore located a pivotable drawbar 128, which can be set in a chosen one of a plurality of different positions and which is made from sheet material having a thickness corresponding with the thickness of closing plates 120 and 121. Drawbar 128 is pivotable by means of a vertical pivotal shaft 129 located, in the mounted state, near shoulder 119 and is settable in a chosen position by a pin 130 which can be entered through any one of a plurality of vertically registering openings or holes 131 in plates 126 and 127 and through a hole in drawbar 128. The distance between the centers of holes 131 and the center of the pivotal shaft 129 is, of course, the same for all the holes. Pivotal shaft 129 is removable from plates 126 and 127 so that drawbar 128 may be utilized at will or be temporarily removed. The two plates 126 and 127 have rearwardly projecting bulging parts 132 near the plane of substantial symmetry of the rear tractor unit, the shape of said bulging parts as seen in FIG. 10 being such that the regions of plates 126 and 127 which are associated with bulging parts 132 are depressed downwardly and upwardly respectively whereby, between these depressed parts of plates 126 and 127, a space is provided for a towing hook, towing ring or the like of a towed vehicle or implement to be inserted between plates 126 and 127 and to be fixed in place by means of a lock bolt, hitch pin or the like which can be passed through registering holes 133 in bulging parts 132. The assembly of supporting members 124 and 125, plates 126 and 127 and drawbar 128 may, if desired, be temporarily removed by disengaging pivotal shafts 122 and 123 so that lifting arms 106 and 107 may be employed for attaching a machine or a tool if said assembly would otherwise hinder such use. The height of drawbar 128 and of the towing device formed by plates 126 and 127 above the ground is less than the height of the center of gravity of the hole tractor above the ground, the first height being, moreover, less than the wheel radius of one of the identical front and rear wheels 7 and 8.

Engine 3 comprises an exhaust device for exhaust gases having two outlet pipes 134 and 135 (FIGS. 1 and 2) which join silencers 136 and 137 respectively. Considered in the direction A, the tubular outlet members 134 and 135 are located at opposite sides of the longitudinal, vertical plane of substantial symmetry of the leading tractor unit, from which plane they are inclined outwardly and, as seen in plan, rearwardly. As seen in side elevation they occupy upwardly inclined positions. As seen in plan, the free ends of the outlet pipes are located near the two outermost, vertical boundary surfaces of the tractor and above the two outermost front wheels 7. Thus, the exhaust gases of engine 3 are expelled in an area located in front of cover plates 138 of engine 4, so that the exhaust gases will not hinder the field of view from cabin 10 to the ground immediately in advance of front wheels 7.

Tank 71 has at least two partitions 139 and 140 (see FIG. 6) which are located one on each side of the longitudinal, vertical plane of substantial symmetry of the front engine unit so as to divide the interior of tank 71, in a liquid-tight manner, into at least three compartments, each of which compartments has fuel supply ports, vent holes, cleaning traps and the like. Tank 91 is similarly provided with at least two hermetic partitions dividing the tank into at least three compartments. In principle, one partition per tank might be sufficient which would divide the tank into two equal compartments. Between the two tanks 71 and 91 connecting pipes or hoses or both are arranged so as to be flexible in the areas of pivotal axes 13 and 14 and are joined so that each compartment of each tank 71 and 91 can be caused to communicate with any other compartment of the same tank or of the other tank. These connecting pipes or hoses or both are all connected in a manner that is not illustrated with a high-capacity liquid pump and with a control-cock, said pump and cock being controllable from driving seat 9 so that the liquid (in this embodiment fuel) can be pumped from a chosen compartment into a further compartment or into a plurality of other compartments of the same tank or of the other tank.

Figure 4:
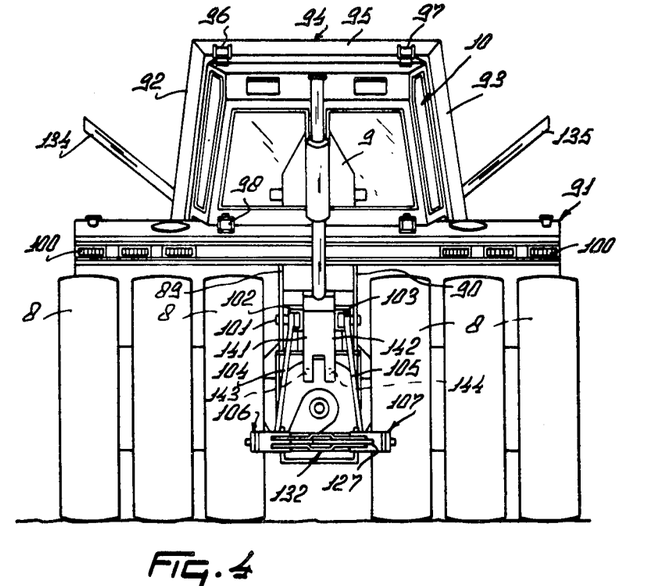
FIG. 4 is a rear view of the tractor shown in FIG. 1.

The two supports 89 and 90, and plate structure 88 are provided with two rearwardly projecting lugs 141 and 142, which lugs are rigidly secured to the frame of the rear tractor unit (FIGS. 1 and 4). Lugs 141 and 142 are connected with one another and have fastening openings 143 and 144 near their free ends for tools, implements or machines to be attached. Lugs 141 and 142 are located at such a distance above lower lifting arms 106 and 107 that they will not hinder the pivotal movement of said lifting arms but they can co-operate with fastening members 122 and 123 of said arms for the attachment of an implement, machine or tool.

The front tractor unit is turanble about the axis of the substantially vertical pivotal shaft 11 with respect to the rear tractor unit through a maximum angle of substantially 100°.

Figure 11:
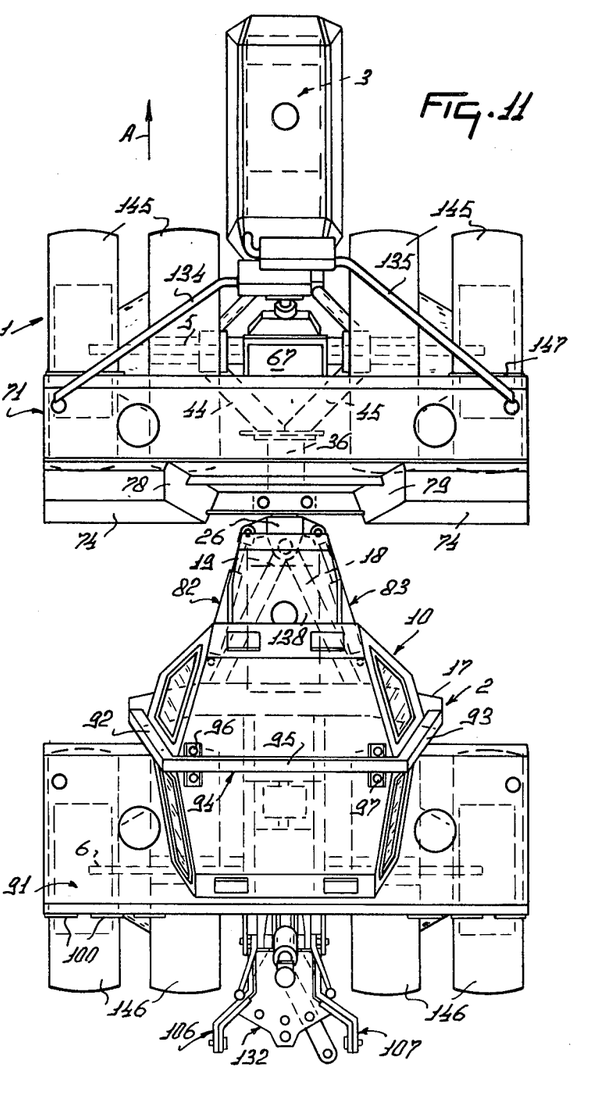
FIG. 11 is a plan view of a second embodiment of a tractor in accordance with the invention.

FIG. 11 illustrates a similar tractor which is supported by four front wheels 145 and four rear wheels 146, the widths (thicknesses) of which exceed those of the ground wheels 7 and 8 in the first embodiment whereas the distance between two immediately neighboring wheels exceeds the distance between two similarly disposed wheels in FIGS. 1 to 10. The over-all width of the tractor is approximately equal to that of the first embodiment. A tractor of this construction is particularly suitable for working on soft, wet or marshy soil since mud, ground water and the like can more readily escape from between the neighboring wheels.

In operation, and under normal conditions, the tractor is driven by the two engines 3 and 4, which separately drive front wheels 7 and rear wheels 8 via the associated clutches, torque converters (gear boxes) and differential gears. The actuating members for the two engines near seat 9 may be detachably coupled to one another when the two engines 3 and 4 are both operating. The tractor is particularly suitable for work on large, even very large, areas in remote regions. Under such conditions, the tractor should have a very large freedom of action, inasmuch as a need for the frequent supply of fuel and other requirements involves considerably greater difficulties than when like needs arise while working on fields near to towns and villages. The capacity of the fuel tanks and hence the radius of activity are so great that very large fields can be worked without interruption by the implements, machines or tools coupled with such a tractor, independently of the refuelling center. According to one aspect of the invention, the high-capacity tanks 71 and 91 can be disposed on that, despite their high capacity, the driver's viewing field of the ground in front of the front wheels, between the front wheels and the rear wheels, and also of any machine, implement or tool coupled with lifting device 102, 103, 106, 107, or with drawbar 128 or towing ring 133 remains free. Viewed from driving seat 9, tank 71 of the front tractor unit is completely located within the viewing angle of the six front wheels 7 or the four front wheels 145. Similarly, tank 91 is also completely located within the viewing angle of the row of six back wheels 8 or four back wheels 146 of the second or rear tractor unit. Despite the high capacity of tanks 71 and 91, the driver's view is not reduced. Moreover, the relatively narrow structure that is obtained by disposing the engine units in sequence is conducive to this uninhibited view. The relatively small width of the driving parts of the tractor is smaller than in the case of two engines arranged side by side or of one large engine unit of the same over-all power rating. This also allows the frame supporting the driving units to be restricted to a smaller width.

Two separate engine units which comprise mass-produced engines and associated component parts will, in general, be cheaper than a single, very large engine unit of the same over-all power which has to transfer exceptionally high forces and torques. In working large fields two separate engine units have the further advantage that, in the event of a failure of one of the engines, the other engine unit will allow continuation of the work or at least the ability to return to a service area. A failure of a single, large engine unit results in the tractor and its attached implements, machines or tools being stranded on a possibly remote field which might be accessible only with great difficulty and which might be at a large distance from any workshop or the like so that local repairs or transport of the tractor and its temporary fittings would be expensive operations. The arrangement of the two tractor units by which they are relativey pivotable about the substantially vertical pivotal shafts 11 results in a comparatively simple construction which may be appreciably less expensive than in the case in which, for example, parts of front axle 5 are required to be steerable. In this way, a comparatively small turning circle is obtained. By means of a hydraulic pump and associated control valves (not shown) the front tractor unit can be turned with respect to the rear tractor unit in steering through curves, for example, by extending the piston rod of the preferably double-acting assembly 82 and simultaneously retracting the piston rod of similar assembly 83 or vice versa. The substantially horizontal pivotal shaft 12, located in the plane of substantial symmetry of the front tractor unit, allows a horizontal turn of front wheel axle 6 for travelling across uneven ground which is important in view of the comparatively large width of the row of front wheels 7 or 145 and of rear wheels 8 or 146. In order to limit the turnability of the front tractor unit with respect to the rear unit, the supporting tube 36 is provided with strips 41 and 42, the lower ends of which form stops which come into contact with the associated contact surfaces of lug 43 (FIG. 7). In this way, the leading and rear tractor units can turn about axis 14 through an angle of 15° in one direction out of a central position and through an angle of 15° in the other direction for the reason that, in the direction of displacement, lug 43 may be considered to be stationary with respect to the rear tractor unit. Inasmuch as the front of the rear tractor unit is located above shaft 11, the compact construction of the tractor requires the provision of the hollow part in tank 71 bounded by the outer surface of plate 72 and the outer surfaces of partitions 78 and 79 in order to avoid contact with the rear engine unit in negotiating bends and in turning about axis 14.

It will be apparent from the drawings that the unit which comprises engine 3 and that forms part of the front tractor unit together with the leading frame portion 1 and axle 5 is located, considered in the direction A, at least partly in front of the associated wheel axle 5, whereas other parts of the front tractor unit i.e. tank 67, tank 71 and heavy, solid shafts 11 and 12 and the associated pivotal shaft structure are located, also considered in the direction A, behind the associated wheel axle 5. The disposition and the weight of tanks 67 and 71, and those of solid shafts 11 and 12 and of the associated parts, are such that the center of gravity of the tractor unit with the wheel axle is located on the side of wheel axle 5 remote from engine 3 and hence behind said wheel axle. The location of the center of gravity is the same when tanks 67 and 71 are empty. This location of the center of gravity of the front tractor unit that is obtained by applying the principle of the invention is of particular importance when large and heavy implements, machines or tools are attached to the lifting device at the rear of the tractor. Owing to said location of the center of gravity of the front tractor unit, the substantially vertical pivotal shaft structure which includes shaft 11 is loaded by a downward, transverse force and by a downward bending moment which reduce or completely counterbalance the great, upward bending moment which results from the heavy implements, machines or tools attached to the lifting device. The same amount also acts upon horizontal shaft 12. With a construction in accordance with the invention, the magnitude of the forces in shafts 11 and 12 may also be acted upon by the distribution of the quantities of liquid in tanks 67 and 71 and in tank 91. The aforementioned liquid or fuel pump permits of pumping quantities of liquid from tank 71 to tank 91 or conversely. By such a transfer of liquid (in this embodiment fuel), the ratio between the ground pressure of front wheels 7 and back wheels 8 can also be varied. Adaptation is also possible when, instead of implements, machines or tools attached to lifting device 102, 103, 106, 107 a towed tool such as a plow is used, in which case the load on shafts 11 and 12 appreciably changes because the force then exerted on the tractor results in different wheel pressures and pivotal-shaft loads. When turning, a torsional load is applied at least partly to the rear tractor unit owing to said location of the center of gravity of the front tractor unit. This load may, if necessary, be regulated, with the aid of partitions 139 and 140, by distributing the load asymetrically in the tanks by means of the liquid pump so that even during long bends, which frequently occur in agricultural operations, a favorable moment in the pivotal shafts is obtainable.

With the disposition of tanks 67 and 71, as viewed in plan, between the wheel axle 5 and the substantially vertical pivotal shaft 11 but in the direct proximity of axle 5 (FIG. 1), the full weight of said tanks with their contents, if any, contributes to the ground pressure of front wheels 7 so that, with this arrangement, engine unit 3 exerts a very high driving torque without the risk of wheel slip, while a very large contact surface with the ground involving a favorable wheel pressure is obtained by the six wheels 7 or the four broad wheels 154 so that a high torque may be exerted without slippage. In a similar manner, the weight of fuel tank 91 and of the parts associated therewith fully contributes to the ground pressure of the six back wheels 8 or the four broad back wheels 146, which also have a large contact surface with a reasonably high ground pressure. The considerable weight of tank 71, when empty, is due to a considerable extent to the relatively heavy plate 72 that covers the whole width of the tractor.

Although certain features of the tractors which have been described and which are illustrated in the accompanying drawings will be set forth in the following claims as inventive features, the invention is not necessarily limited to such features and includes within its scope each of the parts of each tractor which has been described, and which is illustrated in the accompanying drawings, both individually and in various combinations.

I claim:

1. A tow bar assembly for use on large tractors wherein heavy forces having horizontal components are exerted by implements connected to the tractor's hitch, said tractor having a lifting device which includes a pair of outwardly diverging arms, said assembly comprising an integral supporting plate adapted to be detachably mounted rigidly between said arms in a substantially horizontal disposition, a coupling member for towing loads pivotally connected to said plate, said supporting plate including securing means for said coupling member outward relative to its pivotal connection to said supporting plate whereby said coupling member may be affixed relative to said supporting plate in a plurality of different positions, a further supporting plate being located parallel to said first mentioned supporting plate and secured rigidly thereto, said coupling member being between said supporting plates are pivotally connected to each said supporting plate, said securing means extending from one said supporting plate to the other said supporting plate, said supporting plates including a pair of supporting members rigidly connected to each of said plates on both sides thereof, said supporting members bearing against said arms and being connected thereto, said arms having closing plates attached thereto which extend toward each other and are adapted to be received between said supporting plates.

2. A tow bar assembly in accordance with claim 1, wherein imaginary extensions of the area of engagement between said arms and said supporting members on each side of said assembly intersect at approximately the inboardmost edge of said supporting plates.

3. A two bar assembly in accordance with claim 2, wherein the pivotable connection between said plates and said coupling member is proximate said intersection.

4. A tow bar assembly in accordance with claim 3, wherein said arms and said supporting members are each connected together by a pair of pivotal shaft means which are in the same substantially horizontal plane as said coupling member.

5. A tow bar assembly in accordance with claim 4, wherein said coupling member is provided with means on its outward end for connecting same to implements, such connecting means being selectively moveable about an arc having the pivotal connection of said coupling member to said plates as its axis, the extension of said arc passing through said pivotal shaft means.

* * * * *